Feb. 23, 1932.   S. I. GANOUNG ET AL   1,846,548
AUTOMOBILE SEAT
Filed Oct. 26, 1928
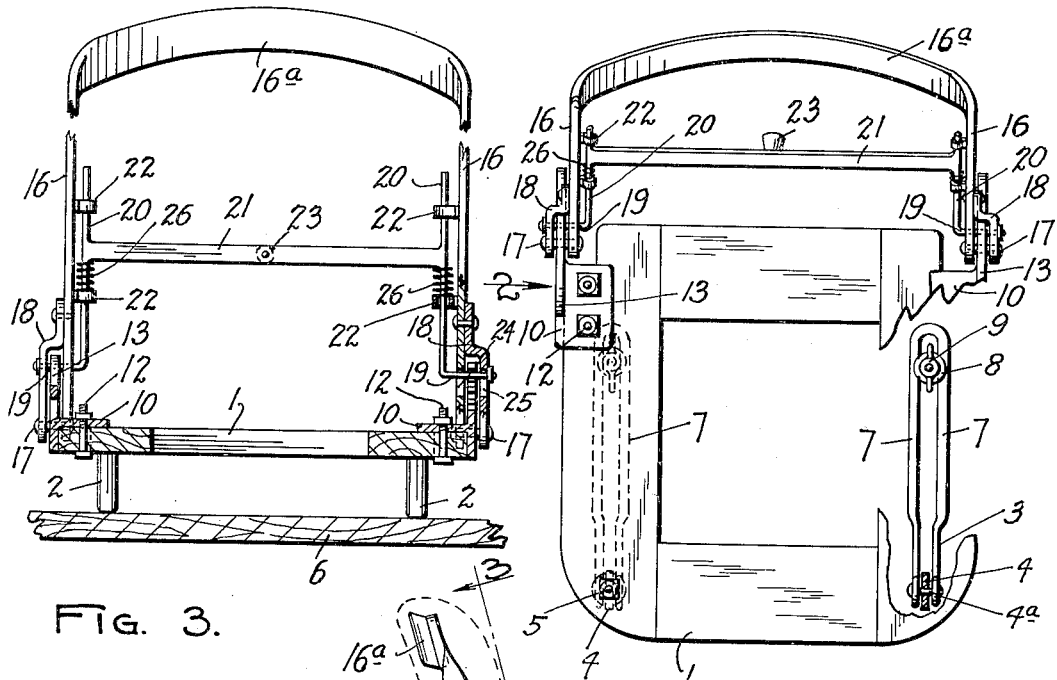
Fig. 3.
Fig. 1.
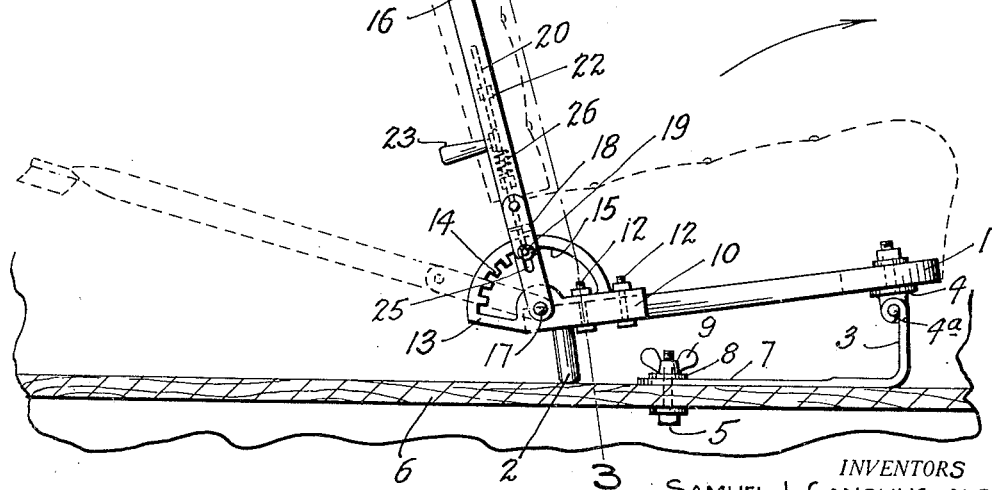
Fig. 2.
INVENTORS
SAMUEL I. GANOUNG AND
CHESTER R. YOUNG.
BY
Clarence A. O'Brien
ATTORNEY.

Patented Feb. 23, 1932

1,846,548

UNITED STATES PATENT OFFICE

SAMUEL I. GANOUNG AND CHESTER R. YOUNG, OF DENVER, COLORADO

AUTOMOBILE SEAT

Application filed October 26, 1928. Serial No. 315,232.

The present invention relates to improvements in automobile seats and has for its principal object to provide a seat that is particularly adapted to be used in the front of an automobile body, such as a sedan, coach or coupé.

One of the important objects of the present invention is to provide an automobile seat that is provided with a hinged back, the back may be adjusted at any desired angle, means being provided for maintaining the back of the seat in any predetermined adjusted position.

Still a further object is to provide an automobile seat of the above mentioned character that includes means for adjusting the entire seat either forwardly or rearwardly or increasing or decreasing the difference between the seat and the front of the automobile body.

Still a futher object is to provide an automobile seat of the above mentioned character which is simple in construction, inexpensive, strong and durable and further well adapted to the purposes for which it is designed.

Other objects and advantages will become apparent during the course of the following description.

In the accompanying drawings, forming a part of this specification, and in which like numerals indicate like parts throughout the same:

Figure 1 is a fragmentary top plan view of the seat structure embodying our invention, the upholstery for the bottom and back of the seat structure not being illustrated, Figure 2 is a side elevation thereof, and Figure 3 is a sectional view taken approximately on the line 3—3 of Figure 2.

In the drawings wherein for the purpose of illustration is shown a preferred embodiment of our invention, the numeral 1 designates the main frame upon which the bottom of the seat is built in the usual manner. The frame is provided at its rear portion with the relatively short legs 2 and engaged with the floor 6 of the automobile body.

A pair of substantially L-shaped brackets 3 form a salient part of the present invention. Each of these L-shaped brackets is formed from a single piece of metal bent into a substantial L and the free ends of the arms are bent back upon themselves to form eyes.

The longer arms of the L-shaped brackets are disposed longitudinally beneath the respective sides of the frame 1 for disposition upon the floor 6 and these angular brackets are adjustably secured in any forwardly or rearwardly adjusted position by means of bolts 5 that extend upwardly through the floor board 6 and engaged with the slotted portion of the horizontally disposed long arms, a wing nut 9 being threaded on the upper end of each bolt and a washer 8 being interposed between the wing nut and the arm 7 as clearly indicated in Figures 1 and 2 of the drawings.

A pair of eye bolts 4 are attached to the bottom face of the forward end portion of the main frame 1 for disposition between the eyed upper ends of the shorter arms of the respective L-shaped brackets 3 and a pintle 4a extends through each pair of eye members and the respective eye bolts whereby the frame 1 is pivotally supported at its forward end for vertical swinging movement.

Furthermore the shorter arms of the L-shaped brackets are of such length as to cause the bottom of the automobile seat to be disposed at an incline as indicated in Figure 1. The angular brackets cooperate with the bolts 5 whereby to permit the seat to be moved either forwardly or rearwardly along the floor board 6.

A pair of brackets 10 are secured on the respective sides of the rear end portion of the frame 1 and each bracket carries the vertically disposed segment 13. The securing means for the bracket is shown at 12. Each segment is formed with the arcuate shaped cut out portion 15 and teeth 14 are formed in the arcuate edge portion of the cut out 15 at the rear end portion of each segment and the purpose of these teeth will be presently described.

A substantially inverted U-shaped frame constructed from any suitable metal comprises the foundation for the back of the seat and this frame includes the side arms 16 and the crown portion 16a. It is of course understood that suitable upholstery is built around the frame. The lower ends of the arms of the inverted U-shaped frame are pivotally secured to the brackets 10 as at 17 so that said frame is capable of swinging movement either in a forward or rearward direction and as will be presently described.

An auxiliary yoke member 18 is secured on the outer face of each arm 16 of the back frame adjacent the free end thereof and each yoke as well as its supporting arm are formed with longitudinally extending registering slots at 25 and 24 respectively in Figure 3 for a purpose to be presently described.

It will also be observed that the depending portion of each yoke is arranged on the outer side of the respective segments 13.

A bar 21 is arranged transversely between the spaced arms 16 of the back frame and carried by the ends of this bar of the vertically disposed rods 20 are operable through suitable guides 22 provided on the inner opposed faces of the arms 16, one pair of such guides being arranged above the bar 21 for cooperation with the upwardly extending ends of the rods 20 while the other pair of these guides are arranged below the cross bar 21 as is more clearly disclosed in Figure 3.

The lower ends of the vertically disposed rods 20 terminate in laterally outwardly extending lock forming pins 19 that project through the registering slots formed in the arms and the respective yoke members. Furthermore these lock pins extend through the cut out portions 15 of the respective segments for cooperation with the teeth 14 and expansible coil springs 26 encircle the rods 20 for disposition between the lower edge of the cross bar 21 and the respective lowermost pairs of guides 22 for urging the bar and the rods carried thereby upwardly whereby to maintain the lock pins in engagement with certain of the notches or teeth 14 whereby to secure the frame that is associated with the back of the seat in any angularly adjusted position with respect to the main bottom frame 1.

A handle 23 is associated with the intermediate portion of the cross bar 21 for manually actuating the same and this handle extends through the portion of the upholstered covering placed over the back frame so that a person may readily have access to the handle.

By exerting a downward pressure on the handle 23, the bar 21 will move downwardly and the rods 20 will simultaneously be caused to travel downwardly in their respective guides 22 as will also the locking pins 19 so that said pins will be moved out of engagement with the pivoted portions 14 of the respective segments and when this operation takes place, the back of the automobile seat may be swung on its horizontal pivot 17 to dispose the back in any reclining position or for causing the back of the automobile seat to be swung forwardly for disposition over the bottom of the seat.

When the handle 23 is released, the coil spring 26 will automatically slide the cross bar, and the rods with the lock pins carried thereby upwardly so that the pins may be brought into locking engagement with the teeth 14 to secure the back in any angularly adjusted position rearwardly of the bottom of the seat and when the back is tilted forwardly over the bottom, the entire seat can be raised by swinging the same upwardly on the pivot 4a thus providing a clear passage to the rear portion of the automobile body.

It will thus be seen from the foregoing description, that we have provided an automobile seat that is particularly adapted to be used in automobile bodies of the sedan, coach or coupé type and said seat will at all times enable the occupant to be seated comfortably.

Furthermore the adjusting means provided for the swinging back is readily accessible and the same can be easily operated whenever necessary.

An automobile seat of this character will not only be strong and durable but also inexpensive.

While we have shown the preferred embodiment of our invention, it is to be understood that various changes in the size, shape and arrangement of parts may be resorted to without departing from the spirit of the invention and the scope of the appended claims.

Having thus described our invention, what we claim as new is:

1. A seat of the character described comprising a bottom member, a back member, a pair of brackets secured to said bottom member at the rear end thereof, said brackets arranged one to each side of said bottom member, each of said brackets having an upwardly projecting internally toothed segment integral therewith, said back member at one end thereof provided with a pair of longitudinally slotted yoke members, one for each of said segments for straddling said segments, pivots securing the lowermost ends of said yoke members to the respective brackets, and spring actuated locking pins operable in the slots of the respective yoke members for engaging with said segments to retain said bottom and back members in any predetermined angular position with respect to one another.

2. In an automobile seat of the character described, a bottom frame member, a pair of brackets secured to the bottom frame member at the rear end thereof, said brackets being arranged one to each side of said bottom frame member, each of said brackets having an upwardly projecting internally toothed segment integral therewith and disposed laterally thereof, a back frame member, said back frame member at one end thereof provided with a pair of longitudinally slotted yoke members, there being one yoke member for each of said segments for straddling said segments, pivots securing the lowermost ends of said yoke members to the respective brackets, a cross rod transversely of said back member, vertically disposed rods carried by said cross rod, guides on the back frame member for said rods, laterally extending pins on the lower ends of the rods operable in the slots of the yoke members for selective engagement with the teeth of said segments, springs cooperating with said guides and said cross rod for normally urging the latter upwardly for retaining said pins in engagement with the teeth of the respective segments, and a handle on said cross rod intermediate the ends thereof and extending rearwardly therefrom.

In testimony whereof we affix our signatures.

CHESTER R. YOUNG.
SAMUEL I. GANOUNG.